united States Patent [19]
Van Houten et al.

[11] Patent Number: 5,957,663
[45] Date of Patent: Sep. 28, 1999

[54] DEDICATED ALTERNATOR COOLING SYSTEM FOR AUTOMOTIVE VEHICLES

[75] Inventors: Robert J. Van Houten, Winchester, Mass.; Steven W. Day, Cazenovia, N.Y.

[73] Assignee: Bosch Automotive Motor Systems Corp., Waltham, Mass.

[21] Appl. No.: 08/745,691

[22] Filed: Nov. 12, 1996

[51] Int. Cl.[6] .............................. F04B 49/10; F01P 7/02; B60H 1/32
[52] U.S. Cl. ........................... 417/13; 123/41.12; 62/133
[58] Field of Search ..................... 417/13, 294; 416/189; 322/46; 236/35; 123/41.12, 41.44, 41.48, 41.49

[56] References Cited

U.S. PATENT DOCUMENTS

| | | | |
|---|---|---|---|
| 3,668,419 | 6/1972 | Cherry et al. | 307/66 |
| 4,100,474 | 7/1978 | Pfeffer et al. | 320/17 |
| 4,313,402 | 2/1982 | Lehnhoff et al. | 123/41.12 |
| 4,358,245 | 11/1982 | Gray | 416/189 |
| 4,425,766 | 1/1984 | Claypole | 62/133 |
| 4,459,519 | 7/1984 | Erdman | 318/254 |
| 4,651,922 | 3/1987 | Noba | 236/35 |
| 4,672,294 | 6/1987 | Norton | 320/17 |
| 4,698,761 | 10/1987 | Cooper et al. | 364/424 |
| 4,955,431 | 9/1990 | Saur et al. | 165/1 |
| 5,323,102 | 6/1994 | Torri et al. | 322/90 |
| 5,656,922 | 8/1997 | LaVelle et al. | 322/46 |
| 5,660,149 | 8/1997 | Lakerdas et al. | 123/41.44 |

*Primary Examiner*—Charles G. Freay
*Assistant Examiner*—Paul L. Ratcliffe
*Attorney, Agent, or Firm*—Fish & Richardson P.C.

[57] ABSTRACT

A cooling system for an automotive vehicle of the type having a radiator through which a coolant fluid flows includes a fan motor for driving a fan which moves air through the radiator; an alternator for supplying an output voltage to the fan motor; and a voltage regulator which selectively excites the alternator's field winding in response to a control signal, determined on the basis of at least one operational parameter of the vehicle indicative of the cooling requirements of the engine which powers the vehicle to control the output voltage of the alternator, thereby controlling the speed of the fan motor.

42 Claims, 9 Drawing Sheets

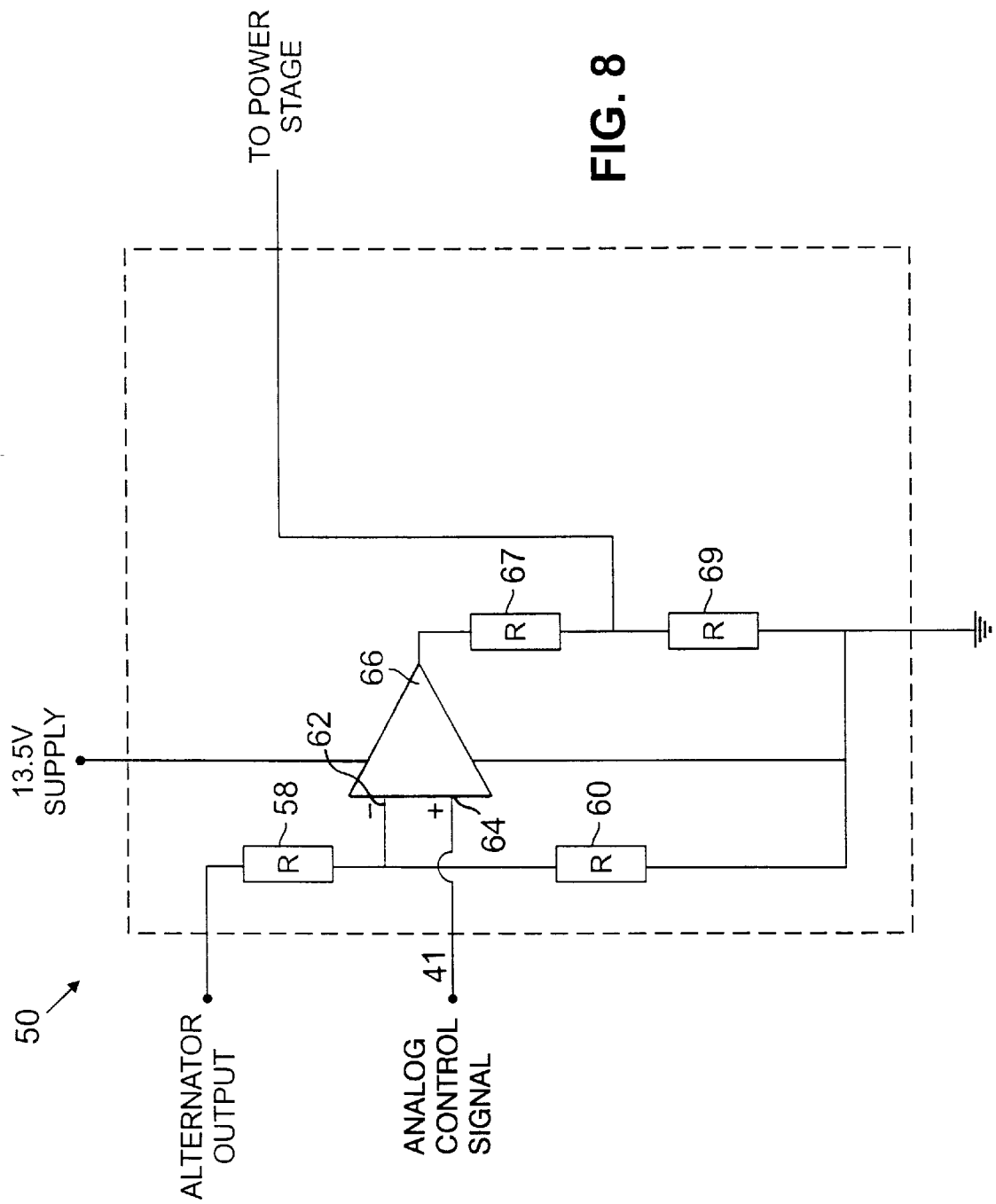

DEDICATED ALTERNATOR COOLING SYSTEM FOR AUTOMOTIVE VEHICLES

BACKGROUND OF THE INVENTION

The present invention relates to the powering of automotive engine-cooling fans. Such fans move air through a radiator through which engine coolant flows. In some cases these fans also cool other heat exchangers such as a charge-air cooler, an oil cooler, or a refrigerant condenser.

The prior art consists of several methods of powering such a fan.

The method used in most light-truck applications is to drive the fan via an accessory drive belt powered by a crankshaft pulley. Typically the fan is attached to a viscous clutch, the engagement of which will vary according to the temperature measured by a bimetallic coil located on the face of the clutch.

The cooling capability of an engine-driven fan is directly proportional to engine speed. It therefore is a good choice for applications where the critical cooling requirement is encountered at high engine speeds (e.g., 3,000 rpm), such as when towing a heavy trailer up a grade. However, in the case of an air-conditioned vehicle, an engine-driven fan often delivers marginal air flow for condenser cooling at idle conditions.

In a typical application, the fan shaft is rigidly attached to the engine and the shroud is attached to the radiator, so that in order to allow for the movement of the engine on its mounts, a large clearance gap is required between the two. The large clearance gap limits the efficiency of this type of fan, but since the fan uses the engine's mechanical power directly, the net efficiency is competitive with other fan powering systems as long as the viscous clutch is fully engaged. When the clutch is not fully engaged, the efficiency is reduced by a factor equal to the engagement ratio of the clutch. Since the fan is often sized for the trailer-towing condition, the required fan speed is generally significantly less than the speed with clutch engaged, so the efficiency averaged over the life of the vehicle is poor.

Clutch durability is also a problem with engine-driven fans. To limit the fan power at very high engine speeds (e.g., 5,000 rpm), the engagement ratio of the viscous clutch is designed to decrease at these speeds. As a result, a large amount of power is dissipated in the clutch, which sometimes leads to clutch failure. When the viscous clutch operates properly, the engine power necessary to power the fans at very high engine speeds is still high due to the power dissipated by the clutch. This reduces the maximum engine power available for powering the vehicle.

Engine-driven fans have very demanding structural requirements. If the clutch locks up, and the engine runs at its maximum speed, the fan speed will be significantly higher than the design speed, and the stresses in the fan will increase by the square of that speed ratio. As a result of this high-speed structural requirement, the fans used on these systems are generally radial-bladed, free-tipped designs. The efficiency and noise advantages of skewed and banded fans cannot be realized.

Other disadvantages of an engine-driven fan system include the fact that it requires that the engine be mounted longitudinally in the vehicle, and limits the positioning of the fan and heat exchangers. In particular, a dual-fan arrangement is difficult to engineer with this system.

In most passenger cars the fan is driven with an electric motor powered from the vehicle electrical system. This system provides excellent idle cooling performance, but its capacity under trailer-tow conditions is limited by available electric power. There are many advantages to this system. An electric fan assembly can have small fan-to-shroud clearances, and can use banded fans. The high efficiency of such a fan can compensate for the inefficiencies of the alternator and motor, yielding a net efficiency comparable to that of an engine-driven fan at full clutch engagement. Skewed blades can be used to reduce noise.

Speed control of electric fans can be more sophisticated, and more efficient, than that of a typical viscous clutch. If the motor is electronically commutated, or a speed controller is included in the circuit, the fan can be run at a speed appropriate to the cooling needs of the vehicle, as determined by the on-board computer. An example of such a speed control system is described in U.S. Pat. No. 4,425,766. The disadvantage of these speed-control methods is that electronic devices capable of handling the high currents involved are quite expensive.

Another advantage to electric cooling fans is that the engine can be placed transversely in the vehicle, an arrangement that often optimizes space utilization. Dual-fan systems can minimize the height of the hoodline in order to achieve favorable vehicle aerodynamics.

Some fan systems combine an engine-driven fan with an electric fan in order to achieve good cooling at both idle and high engine speeds. The electric fan is sometimes arranged as a "pusher" fan upstream of the condenser, or as a "puller" to the side of the engine-driven fan. A hybrid fan system places an electric "puller" fan upstream of an engine-driven fan, in a counter-rotating arrangement. Although the electric fan increases the available air flow at idle, these systems have many of the disadvantages of engine-driven fans enumerated above.

A relatively recent development is the use of hydraulic motors to drive automotive engine-cooling fans. The motor is powered by either the power-steering unit or a dedicated pump. In order to avoid the high cost of a variable-speed pump, a bypass valve is employed for speed control. When the desired fan speed is less than the maximum speed available, some fraction of the hydraulic fluid is recirculated through the bypass valve. This method of speed control is quite inefficient, and results in heating of the hydraulic fluid. Often an additional heat exchanger must be added to the system in order to cool this fluid. This, in turn, increases the fan power necessary to cool the vehicle. A hydraulic system can deliver good cooling at both idle and high-speed conditions, but the overall efficiency of the system is not good.

To summarize, engine-driven fans offer good cooling at high engine speeds, but marginal cooling at engine idle and poor efficiency when cooling demands are moderate. Conventional electric systems cool well at idle, offer reasonable efficiency at all conditions, but don't offer the necessary capacity for heavy trailer-towing applications. Hydraulic systems offer good cooling at idle as well at trailer-tow conditions, but are inefficient at moderate fan speeds.

The present invention also relates to the operation of automotive coolant pumps. Conventionally, a coolant pump is driven directly by the accessory drive belt, with no viscous clutch. Since it runs at a speed proportional to engine speed, the power absorbed at high engine speeds can be considerably greater than that required to cool the engine. To avoid this power loss, electric coolant pumps have been proposed. Such a pump could be run at the speed required for proper engine cooling and heater operation, independent of engine speed.

OBJECTIVES OF THE INVENTION

One objective of the present invention is to provide substantial cooling for a vehicle at high engine speed while maintaining sufficient cooling at idle conditions to cool an air conditioning condenser.

Another objective is to continuously vary the heat-rejecting capacity of the system in proportion to the cooling needs of the vehicle.

Another objective is to provide high efficiency at all operating conditions, so as to help achieve the best vehicle fuel economy possible and increase useable engine power.

Another objective is to avoid the structural and safety problems associated with engine-driven fans.

Another objective is to reduce fan noise.

Another objective is to allow flexibility in the arrangement of the vehicle's under-hood compartment.

Another objective is to achieve the above objectives at minimum cost.

SUMMARY OF THE INVENTION

The present invention is a system for cooling the radiator of an automotive vehicle and possibly other heat exchangers, such as an air-conditioning condenser. It comprises one or several fans, driven by electric motors, which are powered by an alternator dedicated to the cooling function. The output voltage of the alternator is controlled by a voltage regulator to be equal to the desired voltage as determined from various operational parameters, at least one of which is indicative of the cooling requirements of the vehicle's engine.

Because the alternator's capacity is much larger at high speed than at low speed, the system is particularly suitable for vehicles where the cooling requirements at high engine speeds are significantly more demanding than those at idle. In particular, vehicles with heavy trailer-towing capabilities, such as light trucks and sport-utility vehicles, are good candidates. This system offers the high-engine-speed capabilities of an engine-driven fan system, the idle cooling capabilities of an electric system, and high efficiency at all cooling levels between these extremes. Moreover, a relatively inexpensive alternator can be used, making the system economically feasible.

The voltage regulator controls fan speed by controlling the voltage applied to the low-current field winding. This speed control can be much more sophisticated than that of a viscous clutch, and is less expensive than that of a conventional electric system, in that no high-current semiconductor devices are necessary.

In some embodiments, an electric coolant pump is also powered by the alternator. Since the voltage applied to the pump motor is proportional to that applied to the fan motors, the coolant flow rate is approximately proportional to the air flow rate. This can result in optimum heat exchanger performance for vehicles which do not rely on ram air pressure for high speed cooling.

In preferred embodiments the maximum voltage of the system is significantly higher than standard vehicle battery charging voltage. At low speeds, corresponding to engine idle speed, and at full field excitation, the maximum output and the peak efficiency of an automotive alternator are obtained when the output voltage is approximately equal to the battery charging voltage. At higher speeds, maximum output and efficiency are obtained at voltages significantly higher than charging voltage. The fact that the maxima in efficiency and power occur at nearly the same voltage means that the alternator can be operated at this higher voltage continuously without overheating.

Another advantage of high-voltage operation is that at any given power level, the current is reduced in inverse proportion to the voltage. The limiting power level of a mechanically commutated fan motor is often dictated by brush temperature rise, which is largely a function of brush current. By operating at high voltage, the power capability of a motor is significantly increased. Operation at high voltage also reduces the resistance losses in the brushes and internal connections in the motor, as well as the wires which connect the motor to the alternator. This further enhances the system's efficiency.

The choice of maximum operating voltage is determined by several considerations. Personal safety dictates that the voltage not exceed a value of approximately 42 volts. Maximizing fan power dictates that the voltage correspond to maximum alternator output power at the assumed engine speed at the critical cooling condition. In some cases the required idle cooling will influence the choice of maximum voltage. However, for almost any choice of maximum voltage, the idle cooling performance of this system is superior to that of an engine-driven fan.

In the preferred embodiment the alternator field current is obtained from the vehicle's main electric system. The advantages of this system is that excitation current is available at start-up, and field excitation voltage never exceeds the design voltage of a standard automotive alternator.

In the preferred embodiment, the desired cooling voltage is determined from the measured temperature of the engine coolant and, possibly, other parameters. If a condenser is cooled by the system, these other parameters would include the on/off state of the air conditioner, or, preferably, head pressure.

In the case where a coolant pump is not included in the system, the desired cooling voltage can be zero, or a voltage lying between a minimum, non-zero, voltage and the maximum voltage. Both the minimum and the maximum voltage are determined by the envelope of operation of the fan motor(s). In the case where a coolant pump is included, the minimum cooling voltage would likely be determined by the minimum required coolant flow rate.

The preferred embodiment includes a controller which determines the desired cooling voltage and sends an appropriate signal to the voltage regulator. This control signal can be an analog voltage, a digital signal, or a pulse-width modulated signal whose duty cycle is varied according to the cooling demand.

In the preferred embodiment, the fan motors are mechanically commutated permanent magnet motors. These motors have a high specific power, and are fairly inexpensive to manufacture. In some embodiments, two or more motors may be used. For example, two or more motors may be wired in series. In this case the voltage seen by each motor is less than the output voltage of the alternator. If the motors were originally designed to run at battery voltage, they will operate closer to their design voltage than would be the case if they were wired in parallel.

In other embodiments two or more fan motors may be wired in parallel. This arrangement minimizes brush current, and maximizes motor power and efficiency. Combinations of series and parallel arrangements of fan motors may be desirable in certain applications.

In the preferred embodiment, the fans are formed of injection-molded plastic and are banded fans having skewed blades. These types of fans can be very quiet and efficient. An example of a good candidate design is that described in U.S. Pat. No. 4,569,631, hereby incorporated by reference.

Other features and advantages of the invention will be apparent from the following description of the preferred embodiments.

BRIEF DESCRIPTION OF THE DRAWINGS

FIG. 8 is a schematic of the control stage of a voltage regulator.

DESCRIPTION OF THE PREFERRED EMBODIMENTS

Figure 1:
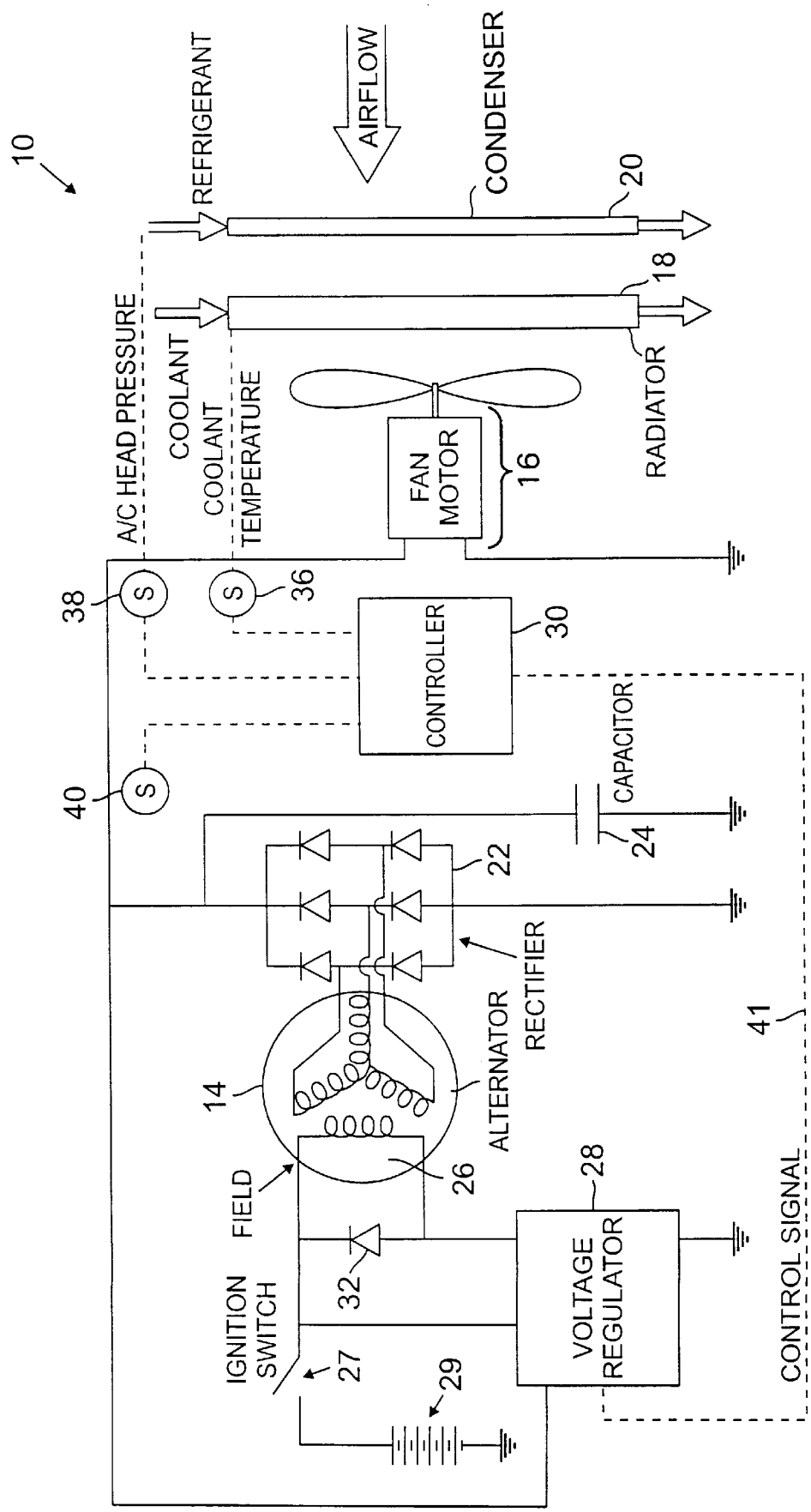
FIG. 1 is a schematic of the invention, where the alternator load is a single fan.

Referring to FIG. 1, a schematic of a dedicated-alternator cooling system 10 is shown. Cooling system 10 includes an alternator 14 powering a single fan 16, which draws air through a radiator 18 and a condenser 20. The output of the alternator passes through a full-wave rectifier 22 and is smoothed by capacitor 24. The alternator includes a field winding 26 energized by the vehicle's primary electric system represented for simplicity by an ignition switch 27 and a battery 29. Advantageously, current is available to field winding 26 even when alternator 14 is first called upon to generate power. Excitation of field winding 26 is controlled by a voltage regulator 28 which intermittently interrupts the excitation circuit so as to maintain the alternator output voltage at the voltage called for by a controller 30. When the excitation circuit is interrupted by regulator 28, the current flowing through field winding 26 is absorbed by a freewheeling diode 32. Controller 30 sets the value of the desired voltage on the basis of operational parameters measured by sensors 36, 38, 40. Sensors 36, 38, 40 measure coolant temperature, A/C head pressure and an additional operational parameter, respectively. Controller 30 may be an on-board computer which controls other aspects of the vehicle's operation. In other embodiments, controller 30 may be a separate microprocessor dedicated to cooling system 10. Controller 30 transmits a control signal 41, representative of the desired alternator output voltage, to voltage regulator 28. This control signal can be an analog voltage, a digital signal, or a pulse-width modulated signal whose duty cycle is varied according to the cooling demand.

Figure 2:
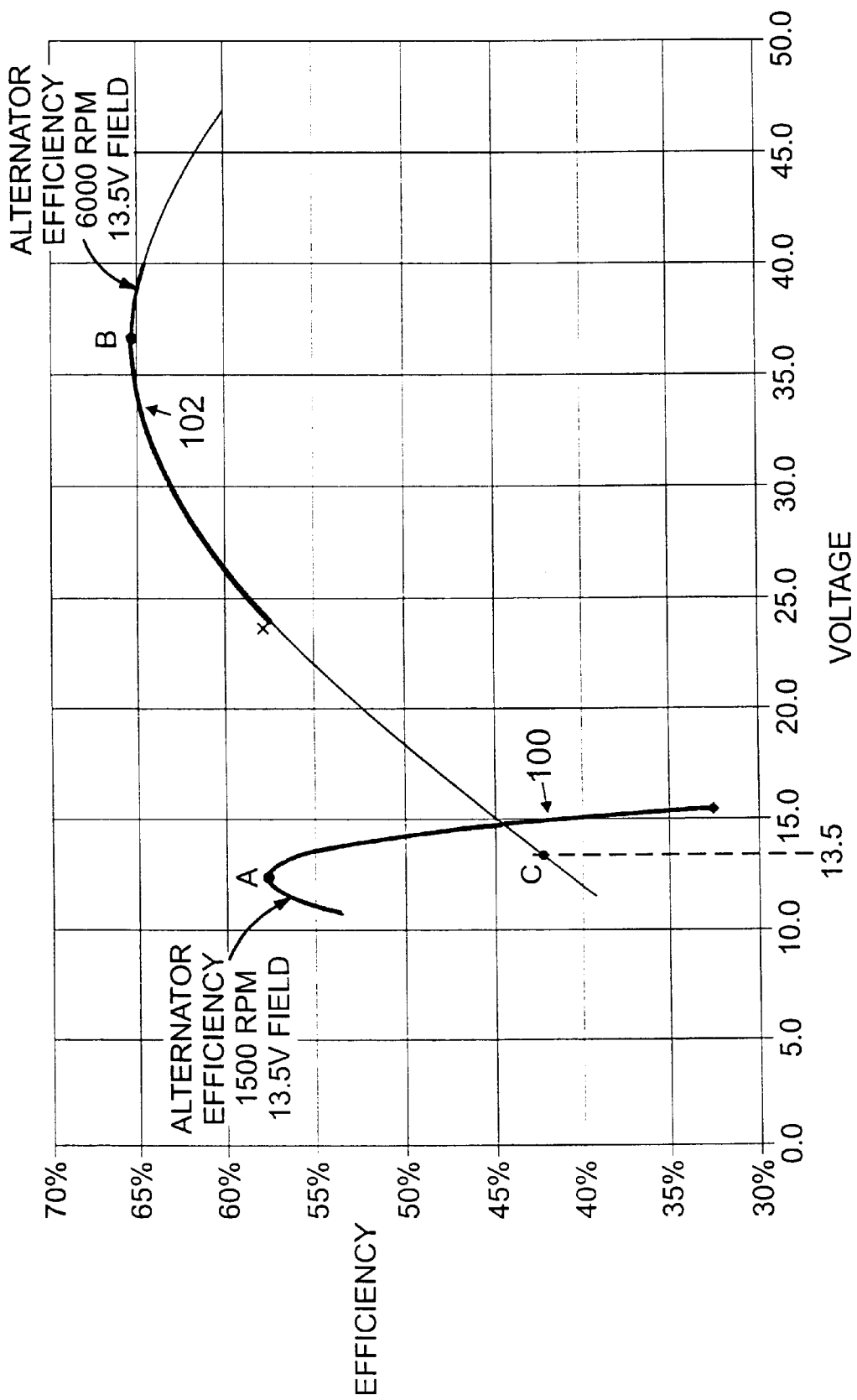
FIG. 2 is a plot of alternator efficiency as a function of voltage with maximum field excitation at two different alternator speeds.

FIG. 2 shows typical efficiency curves (100, 102) of an automotive alternator when the field is energized at a typical battery-charging voltage of 13.5 V. Curve 100, 102 are efficiency curves for alternator speeds of 1,500 and 6,000 rpm, respectively. If the alternator turns twice as fast as the engine, the two curves shown correspond to vehicle idle speed (750 engine rpm) and a trailer-tow condition (3000 engine rpm). At idle speeds the efficiency maximum occurs at point "A", which is approximately at battery-charging voltage. However, at high speed the efficiency maximum occurs at point "B", at a substantially higher voltage. The high speed maximum efficiency is 65%, which can be compared to the high-speed efficiency of 42% at battery charging voltage (point "C").

Figure 3:
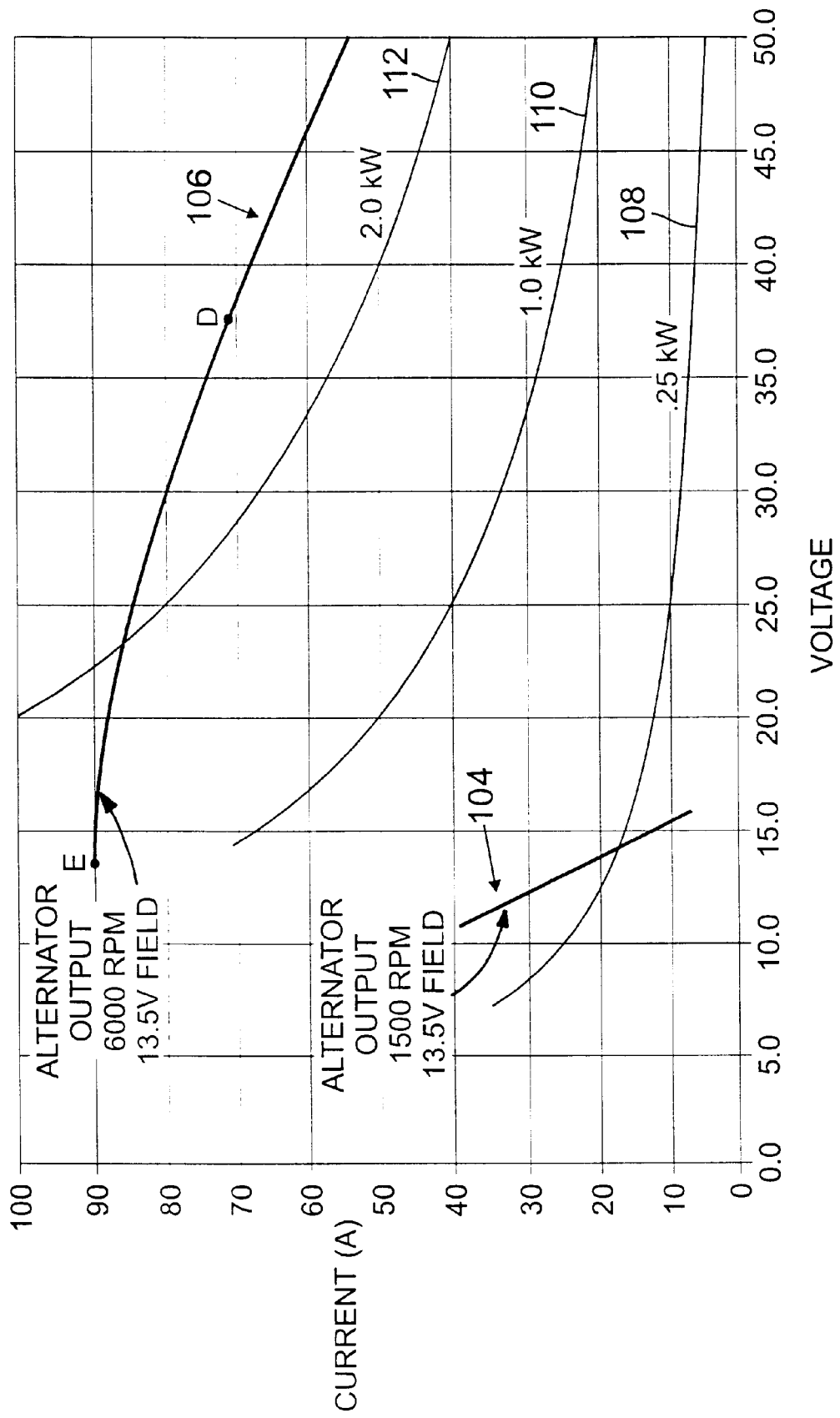
FIG. 3 is a plot of alternator output current as a function of voltage at the two different alternator speeds shown in FIG. 2.

FIG. 3 shows curves (104, 106) of output current as a function of voltage for the same alternator at the same speeds. Also shown are lines of constant electric power (108,110,112). It can be seen that at the high-speed maximum efficiency point "D", which corresponds to point "B" in FIG. 2, the delivered power is approximately 2650 Watts, more than twice the rated power of 1215 W at battery-charging voltage (point "E"). From the efficiency data of FIG. 2, we can calculate the power dissipated as heat in the alternator at points "D" and "E". At point "D" the dissipated power is (0.35/0.65) * 2650=1420 Watts, whereas at point "E" it is (0.58/0.42) * 1215=1680 Watts. So the temperature rise in the alternator can be expected to be less at the high power condition "D" than at the rated condition "E". As a result, it can be expected that the alternator's durability in service will not be degraded as a result of high-voltage operation.

Figure 4:
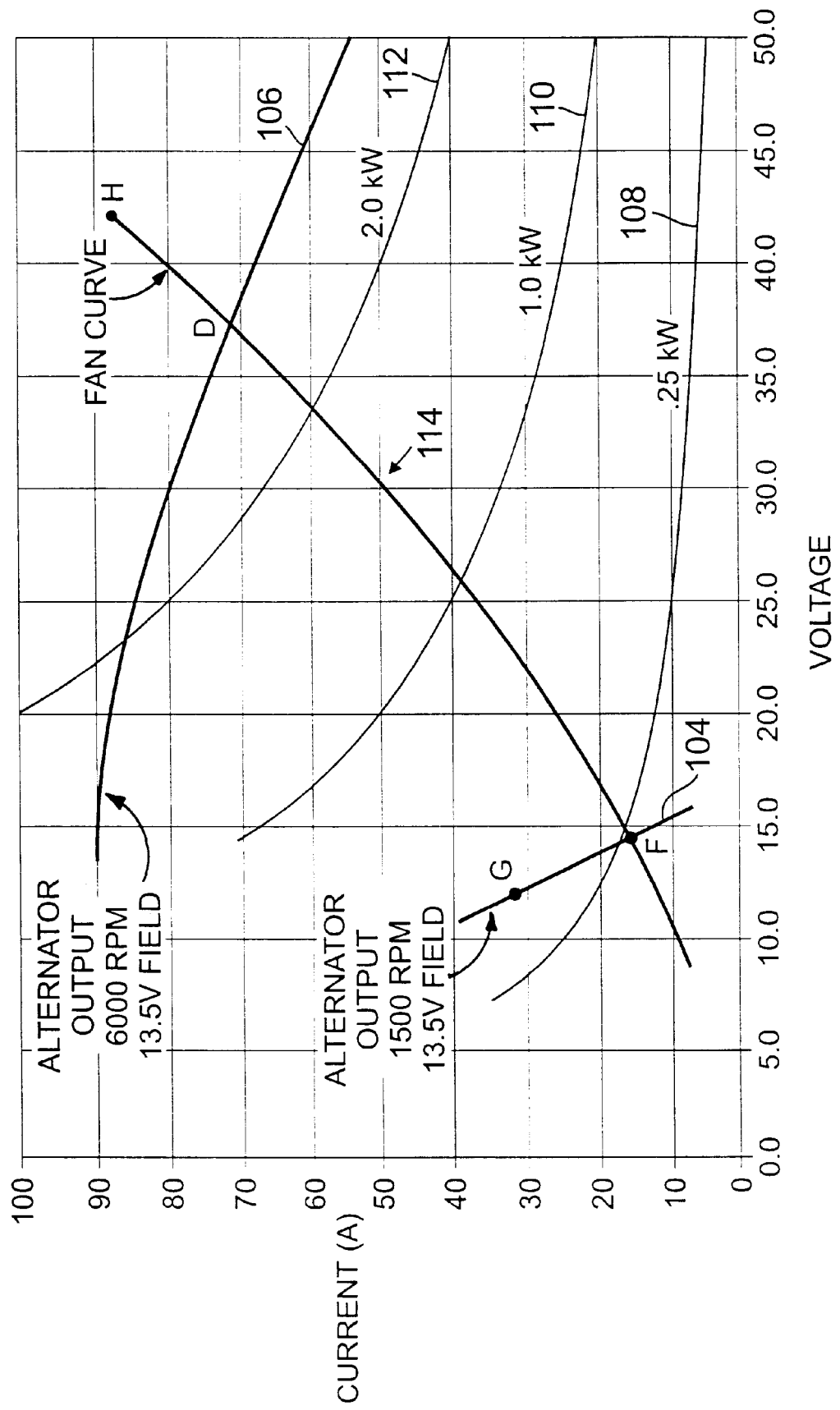
FIG. 4 is a plot of a typical fan load curve overlaid on the alternator output curves of FIG. 3.

FIG. 4 shows the alternator output curves (104, 106) of FIG. 3, along with a curve (114) of current draw as a function of voltage for a fan motor designed to operate at the high-speed maximum efficiency point "D" of the alternator. The maximum power available to drive this fan motor at the lower alternator speed is that corresponding to point "F". In this example, the output power and efficiency of the alternator at idle speed will be less than optimum, since point "F" differs significantly from the idle maximum efficiency point "G" (corresponding to point "A" in FIG. 2) and differs by a greater extent from the maximum power point at idle, which occurs at an even lower voltage. Were the idle cooling to be a problem for this vehicle, the fan motor could be rewound to operate at a somewhat lower voltage. This would increase idle cooling capacity at the expense of some high-speed capacity. Also shown in FIG. 4 is point "H", which corresponds to the maximum voltage for which the fan motor is designed to operate. If the alternator capacity at higher speeds were to exceed the motor's requirement at point "H", the regulator would limit the field voltage to a value such that the output voltage is limited to that of point "H".

Figure 5:
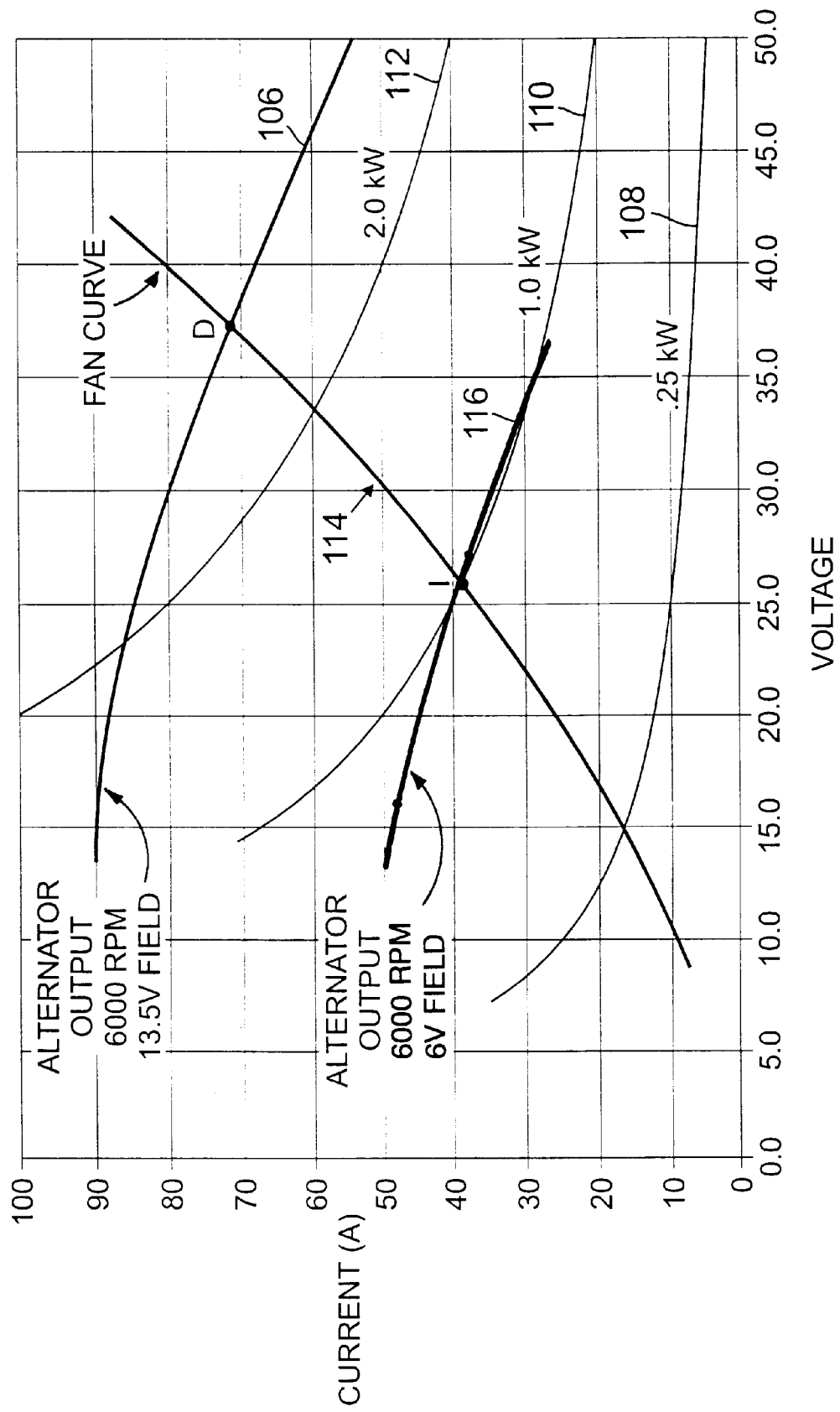
FIG. 5 is a plot of alternator output at two different values of field excitation voltage, and the fan load curve of FIG. 4.

FIG. 5 shows curves of the high-speed output capacity of the alternator at two different values of field excitation (106,116), as well as the fan motor load curve (114) from FIG. 4. If the cooling demand is moderate, the voltage regulator will intermittently interrupt the field current, yielding a mean field excitation voltage less than battery-charging voltage. The output power of the alternator is then reduced, and the fan motor will operate at point "I" instead of point "D". Thus voltages "D" and "F" of FIG. 4 represent the maximum voltages available at the two alternator speeds shown. Any voltage less than those maxima is obtainable through the functioning of the voltage regulator. This is a very efficient means of speed control. Typically, the alternator efficiency at point "I" is almost as high as at point "D".

Figure 6:
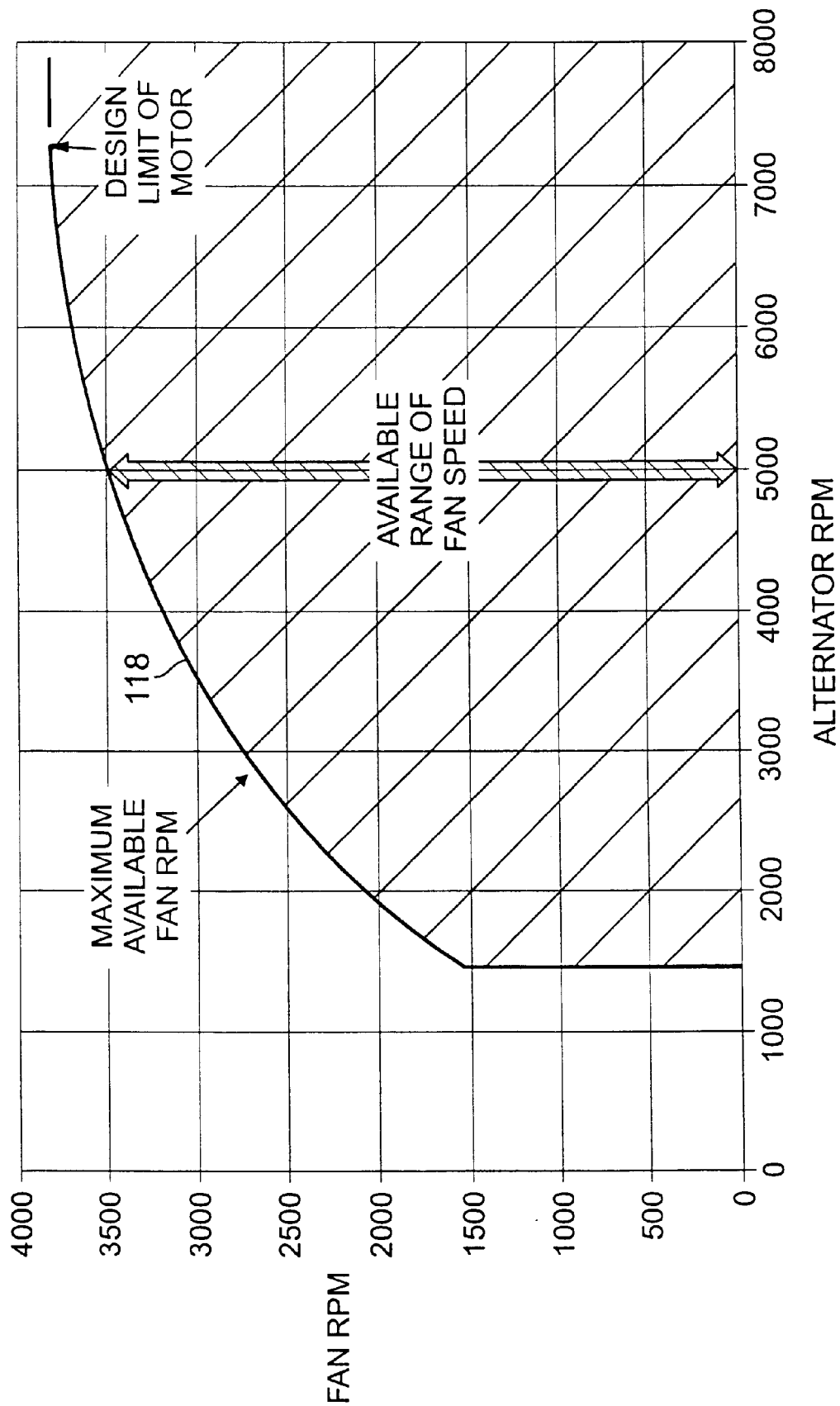
FIG. 6 is a plot of available fan speed as a function of alternator speed.

FIG. 6 shows a curve 118 of available fan speeds versus alternator speed for the alternator and fan motor of FIGS. 4 and 5. It can be seen that at idle conditions (1500 alternator rpm) the maximum fan speed is approximately 42 percent of the maximum available at 6000 alternator rpm. This ratio compares favorably to the corresponding ratio in the case of an engine-driven fan. In that case, the ratio would be equal to the ratio of engine speeds, or 25 percent. At alternator speeds at which the alternator is capable of the maximum obtainable fan speed is limited by the regulator to a fixed value corresponding to the design limits of the fan motor. In the example shown, this maximum fan speed would be approximately 3800 rpm.

It can be seen from FIG. 6 that the curve of maximum fan speed versus alternator speed is very flat at high alternator speed. Thus, it would be relatively easy to design the fan to structurally withstand the largest speed the fan would see in the event that the voltage regulator fails to limit the voltage to the maximum design voltage. The fan can therefore be a banded fan, and can have skewed blades to reduce noise. This represents a significant advantage relative to an engine-driven fan, where excessive fan speeds as a result of clutch failure are a well-known problem, and fan designs are limited to those known to be structurally very strong.

Figure 7:
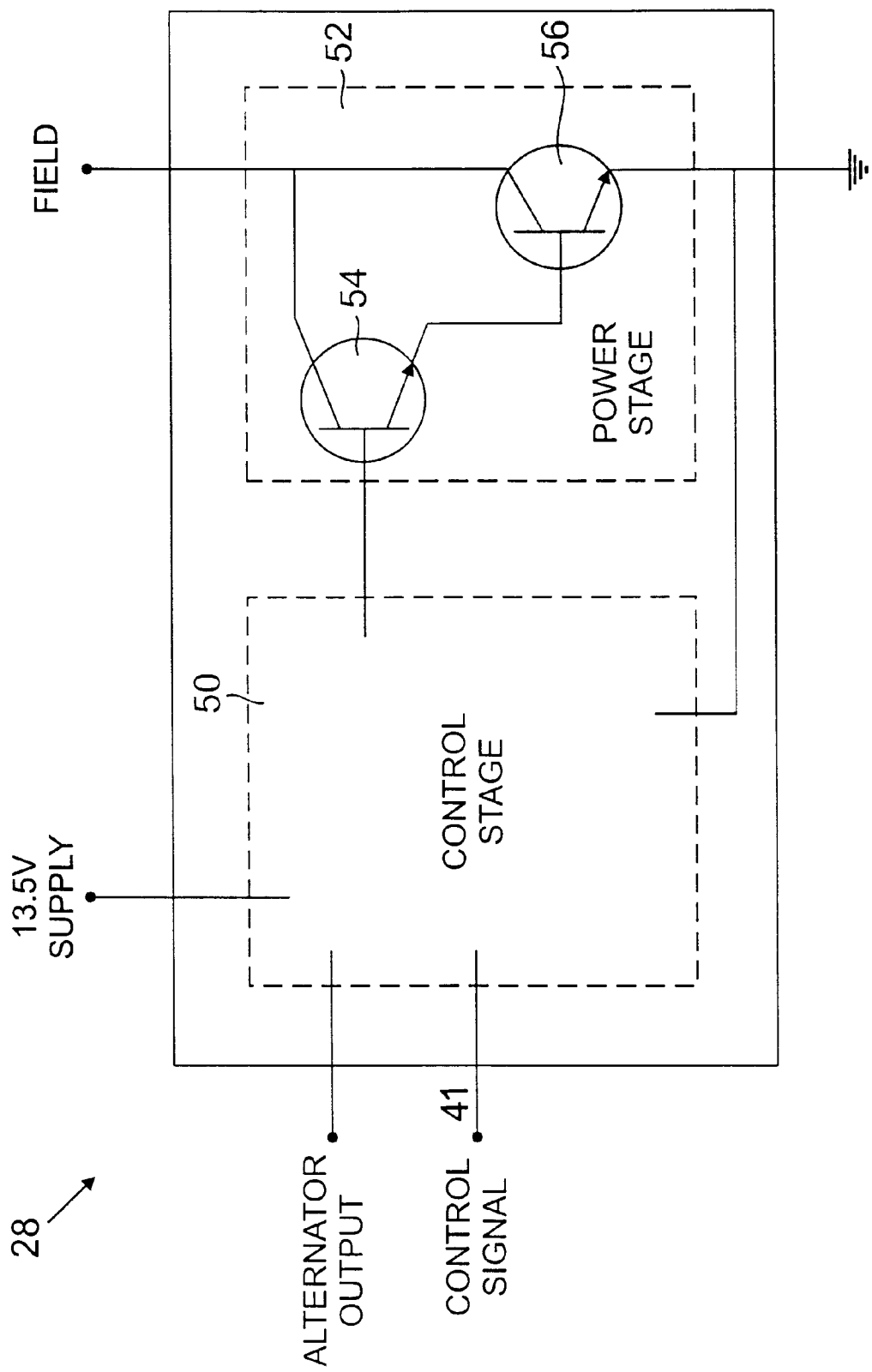
FIG. 7 is a schematic of a voltage regulator.

Referring to FIG. 7, voltage regulator 28 includes a control stage 50 which is supplied with power from the vehicle's primary electric system. Control stage 50 compares the alternator output voltage with the control signal 41 from controller 30 (FIG. 1) representing the desired cooling voltage. Control stage 50 generates an output which is received by a power stage 52 having a pair of transistors 54, 56 configured as a Darlington circuit. Control stage 50 switches power stage 52 to an "on" state when the alternator output voltage is less than the desired voltage, and switches power stage 52 to an "off" state when the voltage is higher than desired.

Referring to FIG. 8, control stage 50 is schematically shown. Control stage 50, as shown here, is suitable when the control signal is an analog signal proportional to the desired cooling voltage. A voltage divider represented by resistors 58, 60 is placed across the alternator output to provide a voltage comparable with the control signal. This scaled output voltage is applied to the inverted input 62, with the control signal applied to the noninverted input 64, of a comparator 66. The output of the comparator is high when the scaled alternator voltage is less than the control signal, and zero otherwise. When the comparator output voltage is high, a voltage is applied to the base of the first power-stage transistor 54, which then closes the field excitation circuit. A resistor 67 is connected between the output of comparator 66 and the base of transistor 54 to limit the current to the rated output current of the comparator. A resistor 69 is connected between the base of transistor 54 and ground and has a value which is large enough to bring the base voltage to the required switching level when the comparator output is high, and low enough to prevent leakage current from spontaneously switching the transistor to the "on" state.

Figure 10:
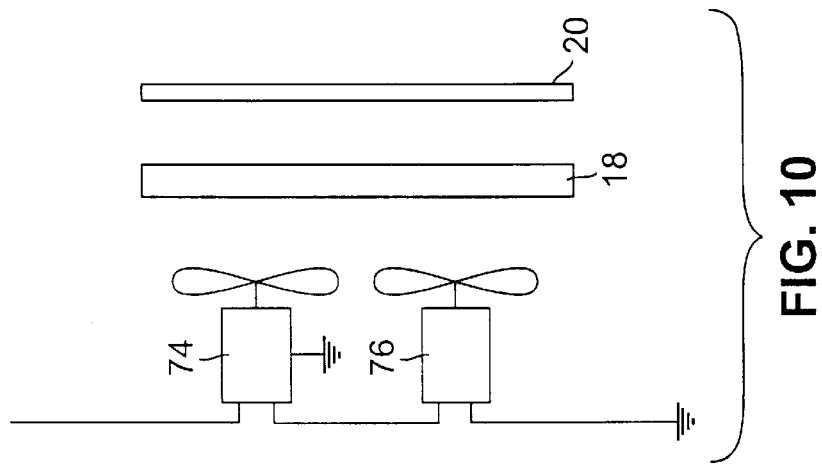
FIG. 10 illustrates the alternator load having two fans wired in series.
Figure 9:
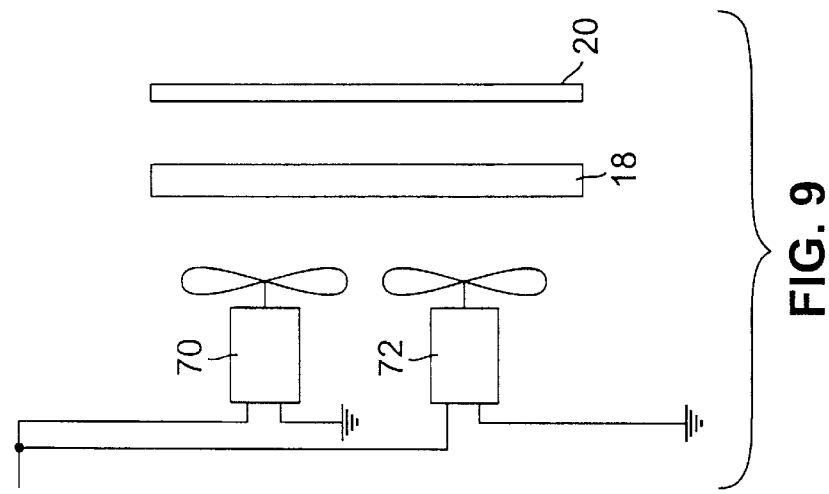
FIG. 9 illustrates the alternator load having two fans wired in parallel.

Referring to FIG. 9, alternator 14 (FIG. 1) may be used to power two fan motors 70, 72 wired in parallel. This arrangement minimizes brush current, and maximizes motor power and efficiency. Alternatively, as shown in FIG. 10, alternator 14 may be used to power two fan motors 74, 76 wired in series. In this case, the voltage seen by each motor is less than the output voltage of the alternator. If the motors were originally designed to run at battery voltage, they will operate closer to their design voltage than would be the case if they were wired in parallel. The case of fan motor 74 is grounded directly to ground, rather than to the negative brush, as would be common practice.

Figure 11:
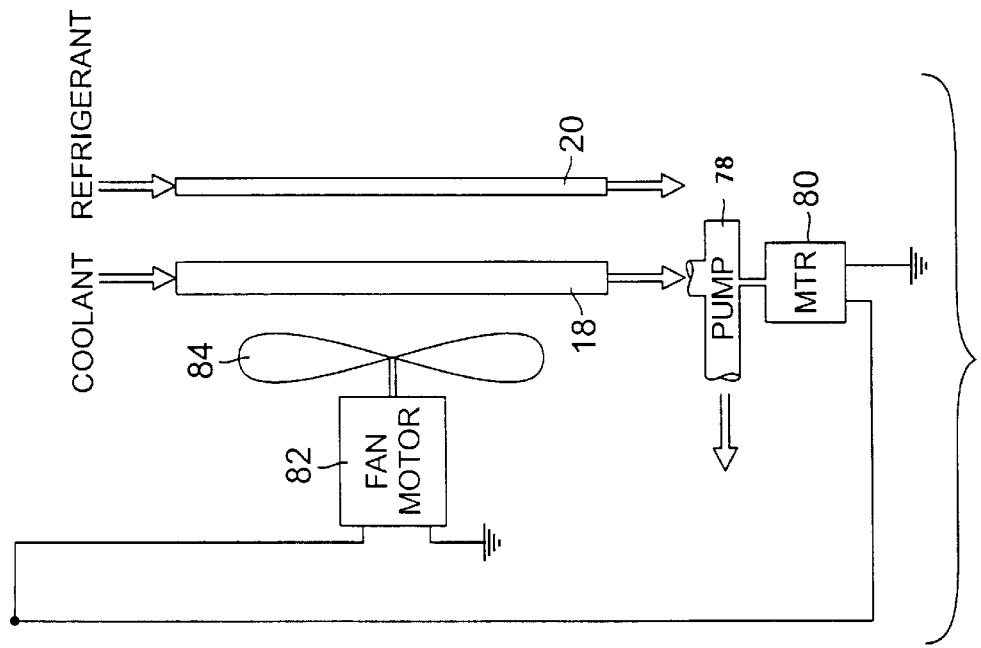
FIG. 11 illustrates the alternator load having a fan and a coolant pump wired in parallel.

Referring to FIG. 11, a coolant pump 78 powered by motor 80 is wired in parallel with fan motor 82 which drives fan 84. Coolant pump motor 80 and fan motor 82 receive the same cooling voltage from alternator 14 (FIG. 1). Thus, as the cooling voltage increases, along with the increased air flow from fan 84, pump 78 provides an increased flow of the coolant fluid through radiator 18.

Other embodiments are within the scope of the claims.

What is claimed is:

1. A cooling system for an automotive vehicle, the vehicle including an engine that powers the vehicle, a radiator through which a coolant fluid flows that cools the engine, a controller, and a first alternator for supplying a substantially fixed voltage, the system comprising:
   a fan motor for driving a fan which moves air through the radiator;
   a second alternator for supplying a variable output voltage to the fan motor, the alternator having a field winding;
   a voltage regulator which selectively excites the field winding in response to a control signal from the controller, determined on the basis of at least one operational parameter of the vehicle indicative of the cooling requirements of the engine which powers the vehicle to vary the output voltage of the second alternator, thereby varying the speed of the fan motor.

2. The system of claim 1 wherein the vehicle includes a primary electric system which operates at the substantially fixed voltage, the substantially fixed voltage being a battery charging voltage and the maximum output voltage of the second alternator is higher than the battery charging voltage.

3. The system of claim 2 wherein the field winding of the second alternator receives current from the primary electric system.

4. The system of claim 1 wherein the maximum output voltage of the second alternator is between 20 and 42 volts.

5. The system of claim 1 wherein the at least one operational parameter is a temperature of the coolant fluid.

6. The system of claim 1 further comprising an air conditioning condenser of an air conditioning system, the fan configured to move air through the condenser, the control signal being determined on the basis of an additional operational parameter representative of the cooling requirements of the air conditioning system.

7. The system of claim 6 wherein the additional operational parameter is representative of the on/off state of the air conditioner.

8. The system of claim 6 wherein the additional operational parameter is representative of the air conditioning head pressure.

9. The system of claim 1 wherein the control signal is an analog signal.

10. The system of claim 1 wherein the control signal is a digital signal.

11. The system of claim 1 wherein the control signal is a pulse width modulated signal.

12. The system of claim 1 wherein the voltage regulator includes a control stage for comparing the output voltage from the second alternator with the desired cooling voltage as communicated by the control signal.

13. The system of claim 12 wherein the voltage regulator includes a power stage which selectively excites the field winding in response to an output of the control stage.

14. The system of claim 1 wherein the fan motor is a mechanically commutated permanent magnet motor.

15. The system of claim 1 comprising a plurality of fan motors connected in series.

16. The system of claim 1 comprising a plurality of fan motors connected in parallel.

17. The system of claim 1 further comprising a fan, the fan being a banded fan having skewed blades.

18. The system of claim 1 further comprising a fan, the fan being formed of injection-molded plastic.

19. The system of claim 1 further comprising an electric coolant pump powered by the output voltage of the second alternator.

20. The system of claim 1 wherein the automotive vehicle requires significantly greater cooling power at high engine speeds than at idle speeds.

21. The cooling system of claim 1, further comprising a rectifier circuit having an AC input and a DC output, wherein the AC input of the rectifier circuit receives an AC voltage directly from the second alternator and the fan motor is electrically connected to the DC output of the rectifier circuit.

22. A cooling system for an automotive vehicle, the vehicle including an engine that powers the vehicle, a radiator through which a coolant fluid flows that cools the engine, and a controller, the system comprising:

a fan motor for driving a fan which moves air through the radiator;

a dedicated alternator for supplying a variable output voltage to the fan motor, the dedicated alternator having a field winding;

a voltage regulator which selectively excites the field winding in response to a control signal from the controller, determined on the basis of at least one operational parameter of the vehicle indicative of the cooling requirements of the engine, to vary the output voltage of the dedicated alternator, thereby varying the speed of the fan motor.

23. The system of claim 22 wherein the vehicle includes a primary electric system which operates at a battery charging voltage and the maximum output voltage of the dedicated alternator is higher than the battery charging voltage.

24. The system of claim 24 wherein the field winding of the dedicated alternator receives current from the primary electric system.

25. The system of claim 22 wherein the maximum output voltage of the dedicated alternator is between 20 and 42 volts.

26. The system of claim 22 wherein the at least one operational parameter is a temperature of the coolant fluid.

27. The system of claim 22 further comprising an air conditioning condenser of an air conditioning system, the fan configured to move air through the condenser, the control signal being determined on the basis of an additional operational parameter representative of the cooling requirements of the air conditioning system.

28. The system of claim 27 wherein the additional operational parameter is representative of the on/off state of the air conditioner.

29. The system of claim 27 wherein the additional operational parameter is representative of the air conditioning head pressure.

30. The system of claim 22 wherein the control signal is an analog signal.

31. The system of claim 22 wherein the control signal is a digital signal.

32. The system of claim 22 wherein the control signal is a pulse width modulated signal.

33. The system of claim 23 wherein the voltage regulator includes a control stage for comparing the output voltage from the dedicated alternator with the desired cooling voltage as communicated by the control signal.

34. The system of claim 33 wherein the voltage regulator includes a power stage which selectively excites the field winding in response to an output of the control stage.

35. The system of claim 22 wherein the fan motor is a mechanically commutated permanent magnet motor.

36. The system of claim 22 comprising a plurality of fan motors connected in series.

37. The system of claim 22 comprising a plurality of fan motors connected in parallel.

38. The system of claim 22 further comprising a fan, the fan being a banded fan having skewed blades.

39. The system of claim 22 further comprising a fan, the fan being formed of injection-molded plastic.

40. The system of claim 22 further comprising an electric coolant pump powered by the variable output voltage of the dedicated alternator.

41. The system of claim 22 wherein the automotive vehicle requires significantly greater cooling requirements at high engine speeds than at idle speeds.

42. The cooling system of claim 22, further comprising a rectifier circuit having an AC input and a DC output, wherein the AC input of the rectifier circuit receives an AC voltage directly from the dedicated alternator and the fan motor is electrically connected to the DC output of the rectifier circuit.

* * * * *